United States Patent [19]

Sado

[11] 4,320,396

[45] Mar. 16, 1982

[54] NUMERICAL VALUE INPUT DISPLAY

[75] Inventor: Ichiro Sado, Tokyo, Japan

[73] Assignee: Canon Kabushiki Kaisha, Tokyo, Japan

[21] Appl. No.: 169,091

[22] Filed: Jul. 15, 1980

[51] Int. Cl.³ .............................................. G06F 3/14
[52] U.S. Cl. ..................................... 340/799; 340/800; 340/168 S
[58] Field of Search ..................... 340/168 S, 711, 798, 340/799, 800

[56] References Cited

U.S. PATENT DOCUMENTS 3,981,000 9/1976 Sado et al. ........................... 340/800
4,243,987 1/1981 Bobick ................................. 340/799

Primary Examiner—Alvin H. Waring
Attorney, Agent, or Firm—Fitzpatrick, Cella, Harper & Scinto

[57] ABSTRACT

In a numerical value input display, by an operating unit input device for entering the unit of a first entered numerical value, the numerical value being displayed on a display unit is taken up in a column corresponding to the unit and, at the same time, the columns less significant than that unit are rendered into a particular condition so that a second numerical value can be displayed at the position of that particular condition. The portion of the display unit rendered into the particular condition produces a display different from the display of the first numerical value or is made blank. The display is provided with a memory for storing the first entered numerical value and the unit of the first numerical value correspondingly to the columns or place in the display unit where it is to be displayed, and a particular code is displayed in the portion representing the unit stored in the memory so that a newly entered numerical value can be stored at the places of the particular code.

11 Claims, 5 Drawing Figures

| KEY OPERATION | DISPLAY |
|---|---|
| C | 0 |
| 1 | 1 |
| 0 | 10 |
| MAN (TEN THOUSAND) | 10 |
| 2 | 10       2 |
| 3 | 10     23 |
| 4 | 10   234 |
| 0 | 10 2340 |
| 5 | 10 3405 |
| C | 0 |
| 1 | 1 |
| 0 | 10 |
| SEN (THOUSAND) | 10 |
| 2 | 10     2 |
| 3 | 10   23 |
| 4 | 10 234 |
| 5 | 10 345 |
| C | 0 |
| 10000 | 10000 |
| 2 | 10 0002 |

NUMERICAL VALUE INPUT DISPLAY

BACKGROUND OF THE INVENTION

1. Field of the Invention

This invention relates to a numerical value input display which is provided with digit keys for entering a first numerical value to be operated on and unit keys for designating the place of the first entered numerical value and which can display the first numerical value with the place thereof designated.

2. Description of the Prior Art

There has heretofore been devised a system in which unit keys designating the places such as MAN (i.e., ten thousand) and SEN (i.e., thousand) are provided in a small electronic computer, namely, an electronic desk-top calculator, to facilitate the entry of particularly great numerical values into the calculator. However, when the display of the calculator is a multi-column display tube, confusion often occurs during the entry. For example, when 10 MAN has been entered by using the MAN key, the display shows 100000. But it may actually be desirable, even after the depression of 10 MAN, to enter a numerical value into the columns less significant than MAN (10,000) and when this is so in connection with an integer, it is may be desirable that four columns can be entered even after the depression of 10 MAN.

On the other hand, when the key of SEN has been used and operated as 100 SEN to enter the same 100000, it may be desirable that information also be entered in the three columns less significant than SEN. Thus, when it is desirable to enter and display 100000, 100000 entered without using a unit key, 100000 entered by using the key of MAN, and 100000 entered by using the key of SEN can differ in meaning and cause confusion to the user. Accordingly, it is necessary that the numerical values entered by these different entering methods be displayed with appropriate distinctions drawn therebetween.

SUMMARY OF THE INVENTION

It is a first object of the present invention to provide a zero display representing a numerical value, entered into the display means of a calculator or the like, that differs from a zero display representing the columns less significant than the place of the numerical value.

It is a second object of the present invention to represent the display of the columns less significant than the place by a hyphen.

It is a third object of the present invention to render the display portion at the columns less significant than that unit into a blank.

It is a fourth object of the present invention to enable a newly entered numerical value to be displayed at the columns less significant than the more significant place.

It is a fifth object of the present invention to cause a particular code to be stored in the portion of memory means which stores such a unit representing the place of the first entered numerical value, and thereafter store a newly entered numerical value therein.

BRIEF DESCRIPTION OF THE DRAWINGS

The invention will be fully explained in the following detailed description thereof taken in conjunction with the accompanying drawings, in which.

DESCRIPTION OF THE PREFERRED EMBODIMENTS

According to the present invention, when a unit key is depressed, a numerical value stored in a shift register is placed in a column correspondingly to the place thereof and at the same time, a particular code corresponding to zero is stored at a column which is less significant than that place. In this case, the display of the zero shown on a display by that code is different from the display of a zero forming part of the numerical value, whereby the zero display in a column into which further input can be made is distinct from the zero display in a column into which no further input can be made.

Thus, according to the present invention, the zero display of a column less significant than the place of the entered unit differs in the cases where a numerical value has been entered by the use of a unit key and where a numerical value has been entered without using the unit key. Therefore, the user of an electronic desk-top calculator using the display apparatus of the present invention can reliably determine whether a further numerical value can be entered into a less significant column or whether a numerical value has already been entered into that column. Accordingly, this numerical value input display apparatus is very effective and greatly versatile.

An embodiment of the present invention will now be described in detail with reference to the drawings.

Figure 1:
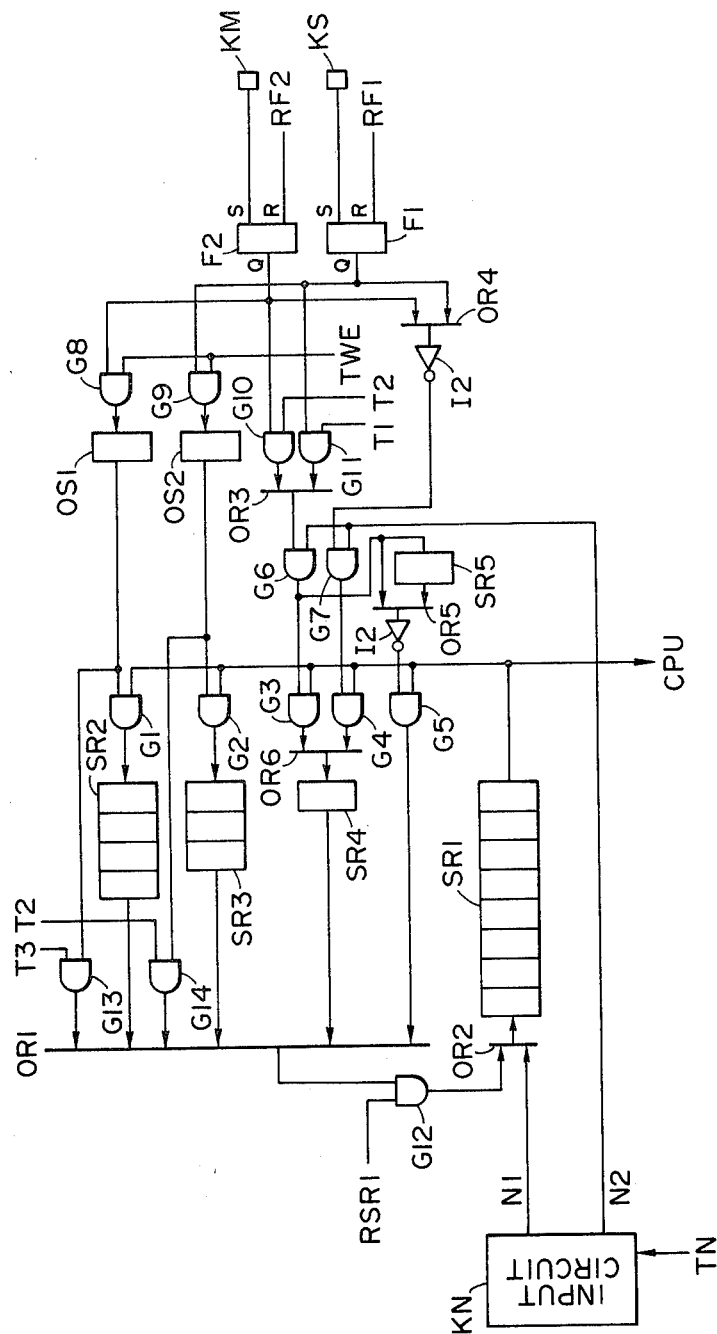
FIG. 1 schematically shows a logic circuit embodying the apparatus in accordance with the present invention.
Figure 2:
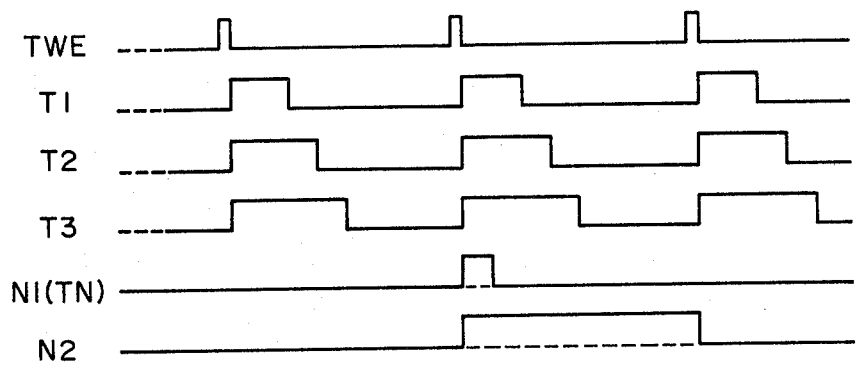
FIG. 2 shows the waveforms of signals generated in the circuit of FIG. 1.

In FIG. 1, an input circuit KN has a plurality of digit keys and when one of the digit keys is depressed, a binary code corresponding to that digit key is time-divided in accordance with a synchronized timing pulse TN and transferred over a signal N1. Further, the operation of the digit key is signalled on a signal line N2 in synchronism with the timing pulse TN. The waveforms of the signals appearing on these signal lines are shown in FIG. 2. The signal appearing on the signal line N2 when the digit key has been operated has a length corresponding to at least the number of input columns to be described (in the case of the present embodiment, eight columns).

Upon operation of the digit key, the binary-coded digit input signal appearing on the signal line N1 is applied as an input to a first shift register SR1 through an OR gate OR2. If the calculator is, for example, an electronic desk-top calculator having an 8-column display, this shift register is a serial dynamic shift register having at least 8×4=32 bits and always stores at the least significant column (i.e., the rightmost end in FIG. 1) the binary code signal developed over the signal line N1 by the TN signal synchronized with one circulation time of the register and, when there is a further digit input, a binary code corresponding to this digit is likewise stored at the least significant column and the previously entered signal is stored at the second least significant column. When there is no input, circulation is effected via an AND gate G5, an OR gate OR1, an AND gate G12 and an OR gate OR2 which will all be described later. The shift register SR1 is connected to one input of AND gates G1–G5 and also to a CPU (central processing unit), in which data processing is effected.

A signal KM is generated when the key, MAN, namely, the key for entering at the unit MAN (i.e., ten thousand), is depressed, and is applied to the set input of a flip-flop F2. Therefore, a high level signal of logic "1" at the output Q of the flip-flop is generated when the key of MAN is depressed. A signal KS is generated when the key, SEN, for entering a numerical value at the unit SEN (i.e., thousand) is operated, and is applied to the set input of a flip-flop F1. Therefore, a signal of logic "1" is generated at the output of flip-flop F1 when the key KS is depressed. These signals of logic "1" appearing at the Q outputs of the flip-flops F1 and F2 are changed into logic "0" by reset signals RF1 and RF2 generated upon depression of operation executing keys (+, −, ×, ÷, C, etc.) and applied to the reset inputs of the flip-flops F1 and F2. The Q output of the flip-flop F2 is applied as input to one terminal of AND gates G8, G10 and OR gate OR4. The Q output of the flip-flop F1 is applied as input to one terminal of AND gates G9, G11 and to the other terminal of the OR gate OR4.

A basic timing pulse TWE as shown in FIG. 2 is applied to the other terminals of the AND gates G8 and G9, and a pulse T1 (having a logic "1" at the portion or timing corresponding to two columns) generated in synchronism with the basic timing pulse TWE as shown in FIG. 2 and a pulse T2 (having a logic "1" at the portion of timing corresponding to three columns) are applied to the other inputs, respectively, of the AND gates G11 and G10.

The outputs of the AND gates G8 and G9 are connected to one-shot multivibrators OS1 and OS2, respectively. The one-shot multivibrators OS1 and OS2 are triggered by the first TWE signal after the flip-flops F1 and F2 have been set upon depression of the unit key and generate a logic "1" during a time corresponding to one circulation of the shift register SR1. The outputs of the multivibrators OS1 and OS2 are applied to shift registers SR2 and SR3 through the AND gates G1 and G2, respectively. The shift register SR2 is a four-column delay shift register which increases the display content of SR1 by 10000 times (namely, shifts the content of SR1 lefwardly by four columns) upon depression the key of MAN, and the shift register SR3 is a three-column delay shift register which increases the display content of SR1 by 1000 times (namely, shifts the content of SR1 leftwardly by three columns) upon depression of the key SEN.

A one-column delay shift register SR4 increases the numerical value already entered into SR1 during digit input by 10 times. Shift register SR4 also increases the code already at the least significant column of SR1 by 10 times, taking such code up one place to cause a code corresponding to a digit key to be stored at the least significant column of the shift register SR1, when depressed after the unit key has been operated, via gate F10 (or G11), OR3, G6, G3 and OR6. A one-column delay shift register SR5 prepares the control timing for fixing the numerical value entered by the unit key and leftwardly shifts only the later entered numerical values each time they are entered, with regard to the digits entered after the depression of the unit key. The shift register SR5 is designed to synthesize the OR signal of the one-column delayed output of the gate G6 with the signal of the gate G6 by the OR gate OR5 and further to apply the inverted signal thereof to the AND gate G5 through an inverter I2.

In the circuit thus constructed, when 10 MAN (i.e., hundred thousand) is entered by the use of the digit keys and unit key, 10 is sotred at the two least significant columns and thereafter the flip-flop F2 is set, whereby the one-shot multivibrator OS1 is operated and the gate G1 is enabled to permit the stored data to pass through the four-column delay shift register SR2. Therefore the content of SR1 shifts leftwardly by four columns and 1 is stored at the sixth column of SR1.

After that, since the flip-flop F2 is set, the T2 timing signal (the timing of the first, second and third columns as shown in FIG. 2) always passes through the gate G10 and is applied to the gate G6 through the gate OR3. Accordingly, when a digit key is depressed next time, a code corresponding to the digit is stored at the least significant column of the shift register SR1 through the gate OR2 and at the same time, the digit code which has already been at the least significant column is delayed by one column by way of the gates G3, OR6 and shift register SR4 and returned to the shift register SR1 through the gates OR1, G12 and OR2, because the output of the gate G6 coincides with the T2 signal by the instruction of the signal line N2, whereby said digit code is shifted to the second least significant column.

Here, the logical OR operation of the gate G6 output delayed by one column time and the G6 signal is effected by the gate OR5 and the inverted signal thereof is generated by an inverter I2. Therefore the fourth, fifth, sixth and seventh columns become a logic "1", whereby the 10 MAN already entered into SR1 is not shifted but is returned to the shift register SR1 through the gates G5, OR1, G12 and OR2. Now, when the digit code stored at the fourth column of SR1 is considered, the fourth column timing signal cannot pass through the gate G6 because the gate G10 is shut out. Therefore, the timing signal does not pass through the column taking-up gate G3. The T2 signal is also delayed by one column due to the action of SR5 and does pass through the gate G5, either. It is therefore understood that circulation during the shift is prevented. In this manner, after the unit of the key MAN has been operated, the digit code in the three least significant columns is always taken up in column and the code of a new numerical value is stored at the least significant column. It is in order to shift the first column information since the output of the gate G6 is directly applied to the gate OR5.

Further, when the key MAN is depressed, the one circulation time gate G13 of the shift register SR1 receives logic "1" at one input thereof from the one-shot multivibrator OS1 and as shown in FIG. 2, the firet, second, third and fourth columns receive a signal T3 of logic "1" at the other input. Therefore during the period of T3, 1 is stored at all of the four least significant columns of the shift register SR1. Accordingly, 4×4=16, bits become 1, a particular code usually called F in the sexadecimal system is stored at the four least significant columns and the 10 previously stored thereat is shifted leftwardly by four columns, whereby the data entered into the shift register SR1 becomes a code 0010FFFF. The output of the shift register SR1 is normally directed to the CPU and usually applied to a most significant column zero suppress circuit, by which it is converted into a code XX10FFFF (X is 4 bits and refers to the other code than 0–9F). As will later be described, codes 0 and F are distinctly displayed by a display driving circuit.

In FIG. 1, RSR1 is the reset signal of the shift register SR1 which is generated from the CPU for the purpose of erasing the input register after operation by operating a clear key, for example. Further, the function of the gate G4 is to detect by the gate OR4 the condition in which both of the flip-flops F1 and F2 have become reset and enable the gate G7 in synchronism with the generation of the N2 signal when a numerical value has been entered, to permit the data to pass through the gate G4 and shift register SR4 to thereby instruct take-up of all columns.

Figure 3A:
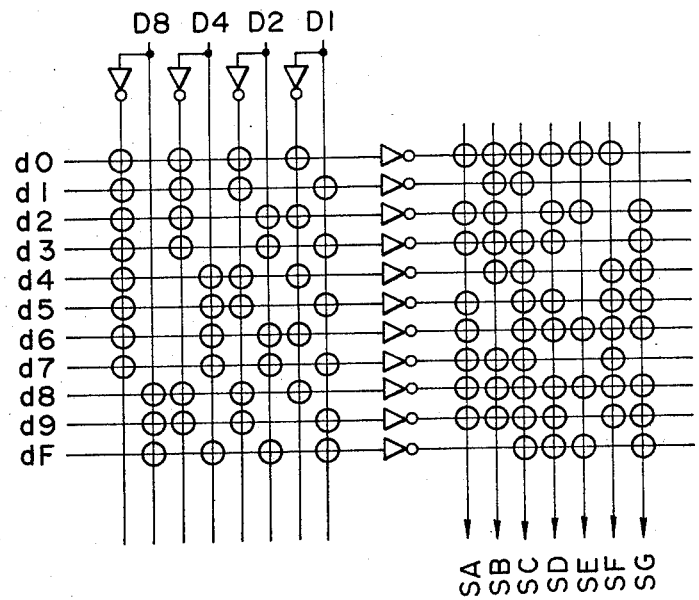
FIG. 3A shows a matrix circuit for displaying the input signal of the FIG. 1 circuit.
Figures 3B, 4:
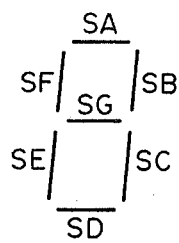
FIG. 3B is a plan view of display segments displaying the output of the matrix circuit of FIG. 3A.
FIG. 4 shows the key operation of the apparatus of the present invention and examples of the display thereof.

Reference is now made to FIGS. 3A and 3B to describe the display driving circuit. FIG. 3A shows a display matrix circuit, in which rows d0–dF are selected by signals $D_1$, $D_2$, $D_4$ and $D_8$ having weights at 1, 2, 4, 8 of one-column signal and. Further SA–SG are selected through a second matrix circuit. These outputs SA–SG, as shown in FIG. 3B, are connected to the segment electrodes of a 7-segment element constituting a display of one digit.

Assuming that the code stored at a certain column of the shift register is 0, $D1=D2=D4=D8=0$, whereby d0 of the first matrix circuit is selected and SA, SB, SC, SD, SE and SF are selected by the second matrix circuit and accordingly, all the segments except SG of FIG. 3B are turned on to display an ordinary zero. On the other hand, if the stored code is F, the display corresponding to this code F assumes a particular condition. That is, for the code F, $D1=D2=D4=D8=1$, and dF of the first matrix circuit is selected, whereby SC, SD, SE and SG are selected by the second matrix circuit and the lower segments of FIG. 3B are turned on to display a small zero. Accordingly, if the code stored in SR1 is XX10FFFF, a display like 100000 is effected and the user can be sure that a new input to the four least significant columns is possible.

Further, 1–9 are displayed in the form of ordinary 7-segment display and therefore, when keys C, 1, 0, MAN, 2, 3, 4, 0 and 5 are successively operated as shown, for example, in FIG. 4, the displays as shown on the right-hand side appear. Further, when keys C, 1, 0, SEN, 2, 3, 4 and 5 are successively operated, corresponding displays appear and, when keys C, 10000 and 2 are operated, displays are likewise obtained as shown on the right-hand side of FIG. 3B. From this, it is seen that the display when 10 MAN or 10 SEN has been entered by the use of the unit key differs from the display when 10000 has been directly entered.

In the above-described circuit, when a key operation like 12345MAN, for example, is effected during the input, a leftward shift by four columns occurs and the leading 1 goes round into the least significant column of the shift register SR1. To prevent this, the gate G1 may have three inputs so that the T3 signal may be applied thereto. That is, the 1 which has been at the fifth column of SR1 is blocked by the gate G1 and the other gates are not empty. Also, it is easy to give warning when such an operation has been effected. For example, when the fifth column of SR1 is 0 or greater during the operation of the key MAN, design may be made such that this is discriminated and a warning is given.

Further, in the foregoing description, when the unit key has been operated the less significant zeros have been described as being displayed as small characters, but they may also be displayed in the form of hyphen (a display effected by using only the central segment SG of the segments shown in FIG. 3B) or blank (in which the display by segments is caused to disappear), and again in the case of blank, it is clear from the example of the display of 10 MAN that it differs from the less significant column zero suppress circuit. This is because, in the less significant column zero suppress circuit which does not take the position of the decimal point into account, 100000 is displayed as 1 and the blank by the present system is displayed as 10 . Also, in the United States, on the basis of the similar concept, the present invention can be adopted by using the key of "Thousand" and the key of "Million".

Thus, with the numerical value input display of the present invention, when a numerical value is entered by the use of a unit key, a simple and clear display is provided to indicate whether or not the zero appearing at a column less significant than the place designated by that unit key can accomodate further entry of digits.

I claim:

1. Numerical value input display apparatus comprising numerical value input means for entering numerical values; unit input means for entering a unit for designating the place of a first numerical value; memory means for storing the first numerical value entered by the operation of said numerical value input means, taking up the place for said entered first numerical value correspondingly to the place of the unit entered by the operation of said unit input means, and storing at a column less significant than said place a particular code for storing a second numerical value to be entered after entry of said first numerical value; and display means for effecting a display of the first numerical value in a first display form and a display correspondingly to said particular code stored in said memory means in a display form different from the first display form of said first numerical value.

2. Apparatus according to claim 1, wherein said memory means holds the memory of the first numerical value entered by the operation of said numerical value input means before said unit input means is operated and stores at the column taken up by said particular code a second numerical value newly entered by the operation of said numerical value input means after said unit input means has been operated.

3. Numerical value input display apparatus comprising numerical value input means for entering numerical values; unit input means for entering a unit for designating the place of a first entered numerical value; and display means operable in a particular condition in which it is capable of displaying the first numerical value entered by the operation of said numerical value input means at a place thereof correspondingly to the place designated by the unit entered by the operation of said unit input means, and displaying at a column less significant than said place a second numerical value entered by the operation of said numerical value input means after entry of the first numerical value.

4. Apparatus according to claim 3, wherein in the particular condition said display means produces a zero display different from the zero display of the first entered numerical value.

5. Apparatus according to claim 3, wherein in the particular condition said display means produces a display different from the display of the first entered numerical value.

6. Apparatus according to claim 3, wherein in the particular condition said display means does not produce a display other than of said first entered numerical value at said place.

7. Apparatus according to claim 4, wherein said display means comprises a plurality of seven-segment display elements in the form of 8, wherein the zero display of said first entered numerical value is effected by operating the circumferential six segments, and wherein in the particular condition the zero display is produced by operating the lower 4 segments including the central segment.

8. Apparatus according to claim 5, wherein said display means comprises a plurality of seven-segment display elements in the form of 8, and wherein the particular condition is displayed by a hypen produced by operating only the central segment.

9. Numerical data input display apparatus comprising numerical value input means for entering numerical data, unit input means for entering a unit for designating the place of a first numerical datum, memory means for storing the first numerical datum and the unit respectively entered by operation of said numerical value input means and said unit means, code storing means for storing a particular code at a column less significant than the place of said first numerical datum stored in said memory means, and display means for displaying said first numerical datum stored in said memory means and for indicating a condition corresponding to said particular code.

10. Numerical value input display apparatus comprising numerical value input means for entering numerical values, a plurality of unit input means each for entering a unit for designating the place of a first numerical value, memory means for storing the first numerical value entered by the operation of said numerical value input means and a particular code representing the unit entered by the operation of one of said unit input means, a plurality of code storing means each for storing the unit entered by one of said unit input means to store said particular code at a column less significant than the place of the first numerical value stored in said memory means, and display means for displaying the first numerical value stored in said memory means and for indicating a condition corresponding to said particular code.

11. Apparatus according to claim 10, wherein each of said plurality of unit input means designates a different place.

* * * * *

UNITED STATES PATENT AND TRADEMARK OFFICE
CERTIFICATE OF CORRECTION

PATENT NO. : 4,320,396
DATED : March 16, 1982
INVENTOR(S) : ICHIRO SADO

It is certified that error appears in the above-identified patent and that said Letters Patent are hereby corrected as shown below:

In the headnote, between item [22] and [51], insert the following: --[30] Foreign Application Priority Data
July 23, 1979 [JP] Japan.........54-93402--

Column 3, line 65, "F10" should be --G10--.

Column 4, line 10, "sotred" should read --stored--;
line 58, "firet" should read --first--.

Signed and Sealed this

Eighteenth Day of May 1982

|SEAL|

Attest:

GERALD J. MOSSINGHOFF

Attesting Officer    Commissioner of Patents and Trademarks